Jan. 24, 1961   F. KRUPS   2,969,229
WEIGHING MACHINE, PARTICULARLY FOR WEIGHING PERSONS
Filed Feb. 14, 1956   3 Sheets-Sheet 1

Inventor
Fritz Krups
By
Bryant & Lowry
ATTYS

Jan. 24, 1961   F. KRUPS   2,969,229
WEIGHING MACHINE, PARTICULARLY FOR WEIGHING PERSONS
Filed Feb. 14, 1956   3 Sheets-Sheet 2

Inventor
Fritz Krups
By Bryant & Lowry
ATTYS.

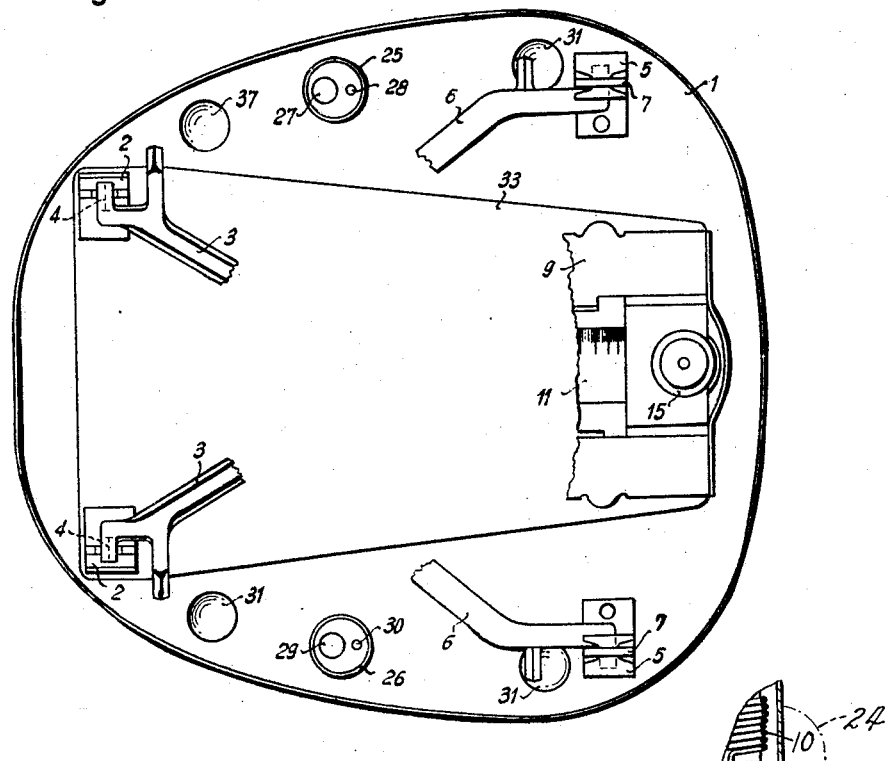

United States Patent Office 2,969,229
Patented Jan. 24, 1961

2,969,229

WEIGHING MACHINE, PARTICULARLY FOR WEIGHING PERSONS

Fritz Krups, Solingen-Wald, Germany, assignor, by mesne assignments, to Detecto Scales, Inc., Brooklyn, N.Y., a corporation of New York Filed Feb. 14, 1956, Ser. No. 565,487

Claims priority, application Germany June 5, 1955

20 Claims. (Cl. 265—68)

The invention relates to a weighing machine, particularly for weighing persons, which is provided with a sheet metal casing and in which the weighing elements are arranged either on the bottom plate or on the under side of the cover plate of the weighing machine casing and in which the load is transmitted to an indicator drum or rotary indicator disk by means of a spring loaded main transmission lever, chiefly through the intermediary of a toothed rack and from this over a pinion. These known weighing machines are open to the objection that, owing to the rigid connection of the individual elements of the indicating mechanism and the spring with the casing of the weighing machine, a weight can only be accurately indicated if the weighing machine rests on the floor with the whole undersurface of the bottom plate of the weighing machine casing or, if this is provided with feet, with all these feet. A condition for this is, however, a level floor which is not available in the great majority of cases. If the weighing machine rests on a floor which is only slightly uneven, the casing of the weighing machine bends, thereby exerting a detrimental effect on the weighing elements of the machine, irrespectively of whether these are on the bottom plate or on the under side of the cover plate of the weighing machine casing, due to the fact that by the relative displacement of certain of the weighing elements errors occur in the indication of the weight. Thus, for example, in the event of the bottom plate of the weighing machine casing sagging in the middle without changing the position of the supporting bearings mounted on the bottom plate and of the bearing of the spring of the weighing machine, certain elements of the indicating mechanism are displaced relatively to the spring, as in the case where the weighing machine is equipped with an indicator drum the axle of which rises with the pinion cooperating with the toothed rack, whereas the toothed rack connected to the transmission lever retains its original position, which results in a partial turning of the indicator drum and consequently incorrect indication of weight. Moreover, incorrect weight indication occurs when, for example, one of the supporting bearings fitted on the bottom plate of the casing of the weighing machine or the main transmission lever of the weighing machine is raised owing to the bending of the bottom of the casing of the weighing machine, in which case the toothed rack of the indicating mechanism, which cooperates with the main transmission lever, is lifted so that the indicator drum is partly rotated. Having recognized these objections inherent to the known weighing machines, it has become the practice to make the bottom of the weighing machine casing in particular so strong, for example of cast metal, that bending of the bottom plate is impossible. However, making the bottom plate in particular as a casting not only results in a considerable increase in the weight of the weighing machine but also detrimentally affects the cost of production.

In view of these facts, the object of the invention is to provide a weighing machine, particularly for weighing persons, which ensures an almost absolutely accurate indication of weight even when the weighing machine rests on an uneven floor or on a carpet.

This problem is solved in that the elements of the indicating mechanism of the weighing machine, comprising chiefly a toothed rack, pinion and indicator drum or indicator disk, and also the spring thereof, are mounted on a carrier which may be properly termed a floating carrier and which at its end remote from the spring is either rigidly connected to the weighing machine casing between the supporting bearings of the transmission lever of the weighing machine or is mounted so that it can swing transversely to its longitudinal axis, and at its other end underneath the spring either rests loosely on the bottom plate of the weighing machine casing or bears loosely against the cover plate thereof or is mounted so that it can swing about its longitudinal axis.

By mounting the elements forming the indicating mechanism and also the spring of the weighing machine according to the invention on a carrier arranged inside the weighing machine casing the errors in indicating the weight, which were hitherto caused by the sagging or bending of the casing of the weighing machine, are prevented, on the one hand because when the weighing machine is equipped with an indicator drum the position of the axle of this drum relatively to the spring remains unchanged, or when the weighing machine is provided with an indicator disk the position of the elbow lever, by means of which the vertical movement of the main transmission lever is translated into the vertical movement of the toothed rack, also in relation to the spring, remains unchanged. On the other hand the indicator drum or indicator disk and spring are able to follow any unintentional movement of the main transmission lever out of its vertical plane.

Other features characterizing the invention are hereinafter described and illustrated in the accompanying drawings.

Several preferred embodiments of a weighing machine for weighing persons according to the invention, in which the weighing elements are carried by the bottom plate of the casing of the weighing machine, are illustrated by way of example in the accompanying drawings, in which.

Figure 1:
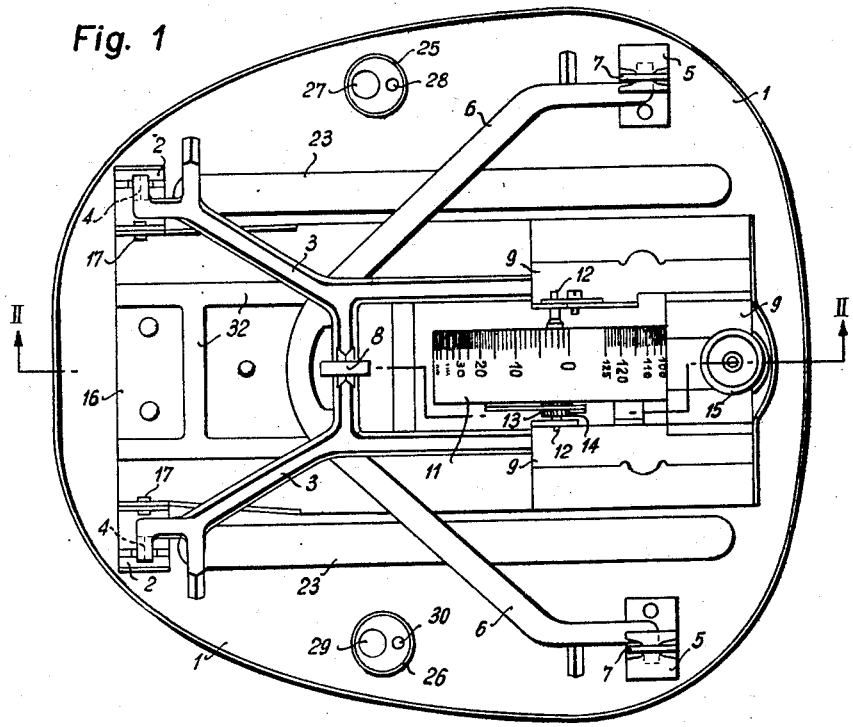
Fig. 1 is a top plan view of a weighing machine with removed cover plate.

Fig. 8 is a top plan view, wherein the elements of the indicating mechanism of the weighing machine, their spring and the supporting bearings for the main transmission lever are mounted separately on a plate; and Fig. 9 is a front elevation thereof; and Fig. 10 is a fragmentary sectional view taken along the longitudinal axis of the carrier showing the upwardly extending punched projection which is adapted to bear loosely against the underside of the cover plate of the casing.

A bottom plate made of sheet metal is designated by 1 and provided with reinforcement ribs 23, whereas a cover plate of the weighing machine for weighing persons is designated by 24 and shown in dot-dash lines in the drawings. Supporting bearings 2 are fixed on the bottom plate 1 and in these bearings a main transmission lever 3 of the weighing machine rests with the aid of knife edges 4. Supporting bearings 5 are also fixed on the bottom plate 1, in which an auxiliary transmission lever 6 of the weighing machine is suspended by means of a hanger attachment 7. A hanger attachment 8 connects the auxiliary transmission lever 6 with the main transmission lever 3 which at its closed end is hooked on to a coil spring 10 hung in a bearing bracket 9. 11 designates an indicator drum which is mounted with its axle 12 in a suitably widened portion of the bearing bracket 9 for the spiral spring 10. On to this axle 12 of the indicator drum 11 a pinion 13 is pressed which meshes with a toothed rack 14 connected at its lower end with the main transmission lever 3 of the weighing machine. 15 designates an adjustment screw by means of which the indicator drum 11 can be set to its zero position. The bottom plate 1 also has recesses 25, 26 each provided with two perforations 27, 28 and 29, 30 respectively, in which tension springs connecting the bottom plate 1 and the cover plate 24 are hooked at one of their ends. These tension springs are not shown in the drawings. The weighing machine illustrated in Figs. 8 and 9 is also provided with feet 31 pressed out from the bottom plate 11.

Figure 2:
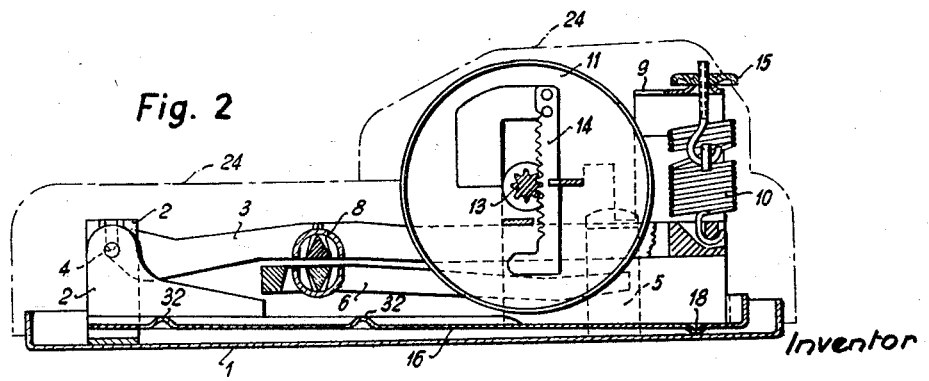
Fig. 2 is a vertical section on the line II—II of Fig. 1.
Figure 3:
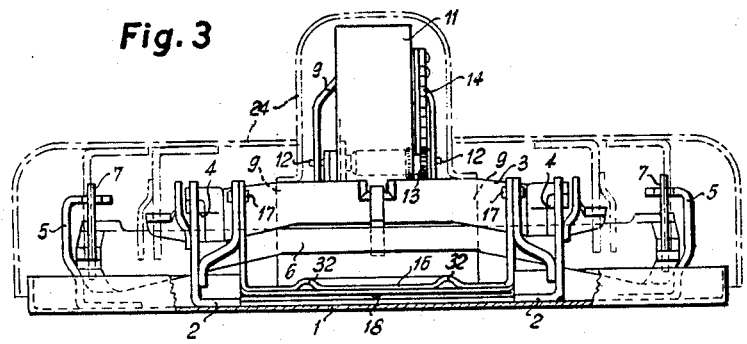
Fig. 3 is a front elevation thereof.

The elements of the indicating mechanism of the weighing machine, consisting of the indicator durm 11, the pinion 13 and the toothed rack 14, and also the spiral spring 10 of these elements are anchored on a carrier 16 provided with reinforcement ribs 32 by means of the common bearing bracket 9 (see Figs. 1 and 2 of the drawings). This carrier 16 is slipped at its end remote from the spiral spring 10 on to journal pins 17 on the two supporting bearings 2 of the main transmission lever 3 and can swing about these pins, which are arranged with their longitudinal axis on the line connecting the two knife edges 4 of the main transmission lever 3. The carrier 16 rests at its other end on the bottom plate 1 of the casing of the weighing machine by means of a projection or wart 18 punched in its longitudinal axis.

Figure 4:
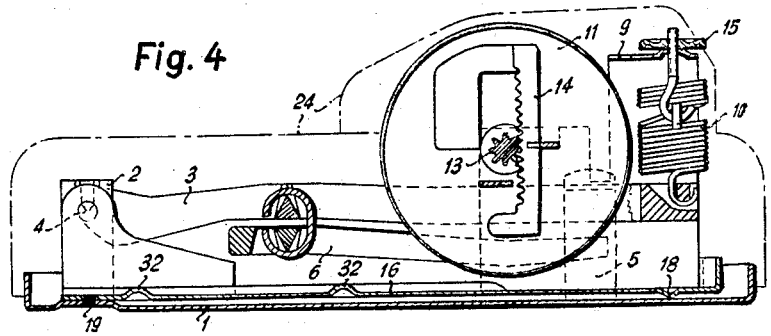
Fig. 4 is a longitudinal vertical section wherein the carrier for the individual elements of the indicating mechanism and the spring of the weighing machine is unshiftable at its end remote from the elements.

In the weighing machine illustrated in Fig. 4 the carrier 16 is connected by spot welding at its end remote from the spiral spring 10 to the bottom plate 1 of the casing of the weighing machine at 19 between the two supporting bearings 2 for the main transmission lever 3, so that the welding spots are located in a line extending in the vertical plane through the knife-edges 4 of the main transmission lever 3 of the weighing machine, parallel to the knife edges 4. The bearings 2 are mounted directly on the bottom plate 1. The carrier 16 in this device has a projection 18 at the end adjacent the spring to provide a lateral rocking movement to carrier 16 on the plate 1 in the event the other end of the plate is laterally distorted by an uneven floor, without vertical displacement of the spring support which is mounted on the corresponding end of carrier 16. Thus, the bowing of the bottom plate 1 due to any floor unevenness will not have any detrimental effect on the carrier 16 owing to the "yieldable" mounting thereof.

Figures 5, 6:
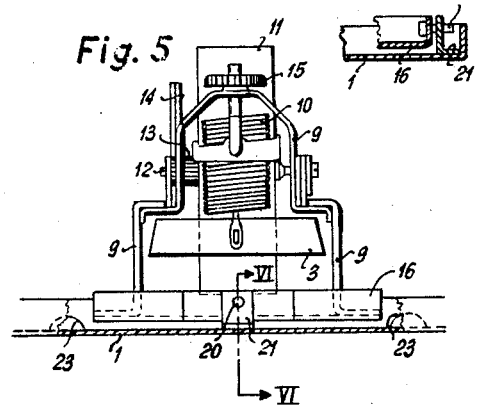
Fig. 5 shows a detail in front elevation, wherein the carrier is mounted so that its end directed towards the spring of the weighing machine can swing about its longitudinal axis.
Fig. 6 is a section on line VI—VI of Fig. 5.

In the weighing machine illustrated in Figs. 5 and 6 the end of the carrier 16 directed towards the spiral spring 10 is slipped on to a pin 20 so that it can swing about its longitudinal axis, this pin 20 being arranged on a bracket 21 resting firmly on the bottom plate 1 of the casing of the weighing machine.

Figure 7:
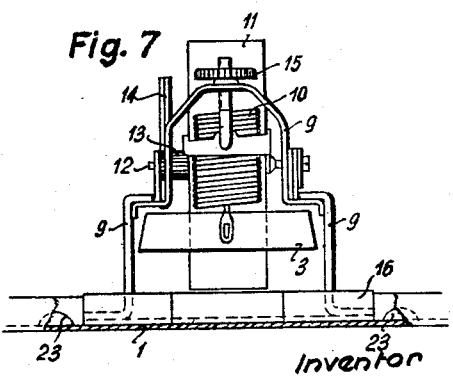
Fig. 7 shows a detail in front elevation in which the carrier rests on its entire width at its end directed towards the spring of the weighing machine.

In the weighing machine shown in Fig. 7 the carrier 16 at its end adjacent the spiral spring 10 bears on its entire width on the bottom plate 1 of the casing of the weighing machine. This, however, is a loose bearing, not fixed to the bottom plate, so that it will yield to distortions of the bottom plate, as in the other forms, without distorting itself.

In the weighing machine illustrated in Figs. 8 and 9 of the drawings, the elements of the indicating mechanism of the weighing machine, comprising the indicator drum 11, the pinion 13 and the toothed rack 14, and also the spiral spring 10, are rigidly mounted on the forward end of a plate 33 by means of the common bearing bracket 9 and the supporting bearings 2 for the main transmission lever 3. This plate at its forward end is provided with a punched projection 34 bears loosely on the bottom plate 1 whereas its other and rear end is slipped with clearance on to bolts 35 mounted on the bottom plate 1. It is not intended that the carrier plate 33 normally move vertically with respect to these bolts. They are provided merely to more positively anchor the plate against lateral displacement on the bottom plate 1.

In Fig. 10 a weighing machine, substantially similar to the above weighing machines, includes a carrier 16 having at its end adjacent the spiral spring 10 an upwardly extending punched projection 18'. This projection 18' is adapted to bear loosely against the underside of the cover plate 24 of the weighing machine casing and is located substantially along the longitudinal axis of the carrier.

From the above detailed description of the invention, it is believed that the construction will at once be apparent, and while there are herein shown and described the preferred embodiments of the invention, it is nevertheless to be understood that minor changes may be made therein without departing from the spirit and scope of the invention as claimed.

I claim:

1. A weighing machine, particularly intended for weighing persons, comprising in combination a casing having a cover plate and a bottom plate, weighing elements arranged in said casing between said cover plate and said bottom plate, said weighing elements consisting substantially of a rotary indicator member having a pinion, a main transmission lever with knife edges, a vertical spiral spring acting on one end of said main transmission lever and a toothed rack cooperating with said pinion to transmit the movement of said main transmission lever to said rotary indicator member against the action of said spiral spring, supporting bearings on said bottom plate for the knife edges at the sides of the other end of said main transmission lever, a carrier on which certain of said elements and said spiral spring are firmly mounted, the end of said carrier remote from said spiral spring being connected to said bottom plate between said supporting bearings, whereas the other end of said carrier is mounted underneath said spiral spring at least one of said ends of said carrier being loosely mounted on said bottom plate so as to yield pivotally in a lateral vertical plane at said one end when the other end of said bottom plate is relatively distorted due to an uneven floor on which the device is resting, whereby the vertical spacing of the connections between said weighing elements is unaffected by such distortion.

2. A weighing machine as set forth in claim 1, wherein the end of the carrier remote from the spiral spring is unshiftably connected to the bottom plate of the weighing machine.

3. A weighing machine as set forth in claim 1, wherein the end of the carrier remote from the spiral spring is mounted so that it can swing transversely to its longitudinal axis.

4. A weighing machine as set forth in claim 1, wherein the end of the carrier adjacent the spiral spring rests loosely on the bottom plate of the casing.

5. A weighing machine as set forth in claim 1, wherein the end of the carrier adjacent the spiral spring bears loosely against the cover plate of the casing.

6. A weighing machine as set forth in claim 1, wherein the end of the carrier adjacent the spiral spring is mounted to swing about its longitudinal axis.

7. A weighing machine as set forth in claim 1, wherein the end of the carrier remote from the spiral spring is connected to the bottom plate on a line extending in the vertical plane through the knife edges of the main transmission lever and parallel to said knife edges.

8. A weighing machine as set forth in claim 1, wherein journal pins are arranged on the supporting bearings of the main transmission lever, the end of the carrier remote from the spiral spring is slipped on to said journal pins arranged on the supporting bearings of the main transmission lever and rotatable about these pins.

9. A weighing machine as set forth in claim 1, wherein journal pins are arranged on the supporting bearings of the main transmission lever, the end of the carrier remote from the spiral spring is slipped on to said journal pins arranged on the supporting bearings of the main transmission lever and rotatable about these pins, the longitudinal axis of which pins lies in the connecting line of the knife-edges of the main transmission lever.

10. A weighing machine as set forth in claim 1, wherein the end of the carrier adjacent the spiral spring has in its longitudinal axis a punched projection resting on the bottom plate.

11. A weighing machine as set forth in claim 1, wherein a pin is included and the end of the carrier adjacent the spiral spring is oscillatable about its longitudinal axis on said pin.

12. A weighing machine as set forth in claim 1, wherein the end of the carrier adjacent the spiral spring bears on its entire width on the bottom plate of the casing.

13. A weighing machine as set forth in claim 1, wherein the end of the carrier adjacent the spiral spring has in its longitudinal axis a punched projection by means of which it bears against the underside of the cover plate of the casing of the weighing machine.

14. A weighing machine as set forth in claim 1, wherein certain of the elements of the indicating mechanism of the weighing machine comprising the toothed rack, pinion and indicator member, and also the spiral spring cooperating therewith are firmly mounted on a rigid plate by means of a common bearing bracket and the supporting bearings of the main transmission lever, which plate rests at one end loosely on the bottom plate and at its other end is oscillatably connected to the bottom plate.

15. A weighing machine, particularly for weighing persons comprising, in combination, a casing having a cover plate and a bottom plate, said plates being movable with respect to one another, weighing elements including a counterbalance and indicator mechanism, a main transmission lever within said casing for transmitting the vertical movement of said cover plate to said elements, and a carrier supporting said weighing elements, said carrier connected at only one of its ends to one of said plates whereby said weighing elements are floatingly maintained with respect to said plates so that the operation of said weighing elements is substantially independent of torque distortion of said plates.

16. The invention in accordance with claim 15 wherein means are provided for connecting said carrier at only one of its ends to said bottom plate and said counterbalance being located at the other end of said carrier, said carrier extending for substantially a major part of the entire length of the weighing machine along the longitudinal center line of the bottom plate.

17. The invention in accordance with claim 16 wherein fulcrum means are provided for coupling said main transmission lever to said bottom plate and the carrier connecting means being aligned with the main transmission lever fulcrum means.

18. The invention in accordance with claim 15 wherein said counterbalance acts on said main transmission lever and wherein said indicator mechanism includes a rotary indicator member having a pinion and a toothed rack meshed with said pinion for transmission movement of said main transmission lever to said rotary indicator member against the action of said counterbalance, and said counterbalance, indicator member, pinion and rack are all supported by said carrier.

19. The invention in accordance with claim 15 wherein said carrier includes a projection on its free end for resting on said bottom plate for permitting said carrier to rock with respect to said bottom plate.

20. The invention in accordance with claim 15 wherein a short lever is additionally provided within said casing for cooperating with said main lever for transmitting the vertical movement of said cover plate to said elements.

References Cited in the file of this patent
UNITED STATES PATENTS

| | | |
|---|---|---|
| 2,061,278 | Kircher | Nov. 17, 1936 |
| 2,066,243 | Barler | Dec. 29, 1936 |
| 2,105,219 | Kircher | Jan. 11, 1938 |
| 2,788,963 | Provi | Apr. 16, 1957 |
| 2,875,999 | Provi | Mar. 3, 1959 |